United States Patent [19]

Toyoda et al.

[11] Patent Number: 4,990,729
[45] Date of Patent: Feb. 5, 1991

[54] TEACHING CONSOLE PANEL FOR ROBOT

[75] Inventors: Kenichi Toyoda, Hino; Nobutoshi Torii, Hachioji; Susumu Ito, Hino; Akira Tanaka, Hachioji, all of Japan

[73] Assignee: Fanuc Ltd., Yamanashi, Japan

[21] Appl. No.: 265,863

[22] PCT Filed: Feb. 3, 1988

[86] PCT No.: PCT/JP88/00096
§ 371 Date: Oct. 3, 1988
§ 102(e) Date: Oct. 3, 1988

[87] PCT Pub. No.: WO88/06078
PCT Pub. Date: Aug. 25, 1988

[30] Foreign Application Priority Data
Feb. 20, 1987 [JP] Japan .................. 62-35824

[51] Int. Cl.$^5$ ............................................. H01H 9/02
[52] U.S. Cl. .................. 200/293.1; 200/298; 200/332.1
[58] Field of Search .................. 200/298, 293.1, 332.1, 200/332.2, 505, 61.85, 6 A, 341; 901/3, 4

[56] References Cited
U.S. PATENT DOCUMENTS

| | | | |
|---|---|---|---|
| 2,543,450 | 2/1951 | Feagin | 200/332.2 |
| 2,639,344 | 5/1953 | Rickmeyer | 200/505 |
| 2,855,916 | 10/1958 | Foster | 200/332.2 |
| 3,932,721 | 1/1976 | Crowell et al. | 200/505 |
| 4,209,681 | 6/1980 | Somborn et al. | 200/298 |

OTHER PUBLICATIONS

"Designing the Robot Teach Pendant", by Mason, ROBOTIC ENGINEERING, vol. 8, No. 11, Nov. 1986, Petersborough, N.H., pp. 23-25.
"Controlling a Manipulator" by Rand, DESIGN ENGINEERING, May 1987, London, Great Britain, pp. 67, 70 and 74.

Primary Examiner—Renee S. Luebke
Attorney, Agent, or Firm—Armstrong, Nikaido, Marmelstein, Kubovcik & Murray

[57] ABSTRACT

Disclosed is a console panel for a robot, which is provided with a dead-man switch always firmly actuated and easy to hold by the hand and does not cause substantial fatigue of the hand. In this console panel, a pressing plate 9 of a dead-man switch having an elliptical recess 91 on the back surface of the console panel at a position where the tips of the respective fingers simultaneously touch when the console panel is held from the side portion thereof, and this console panel is used for various electrically operated industrial robots.

5 Claims, 5 Drawing Sheets

TEACHING CONSOLE PANEL FOR ROBOT

1. FIELD OF THE INVENTION

The present invention relates to a teaching console panel for a robot, which comprises various keys arranged for electrically operating a robot, and this panel is used for a robot, especially for an industrial robot.

2. DESCRIPTION OF THE RELEVANT ART

A teaching console panel has been used for an electrically operated industrial robot, and for the safety of the operation of the robot, a so-called dead-man switch is assembled in the console panel for being actuated while it is touched by the user's hand and stopped when the user's hand is separated therefrom.

As an embodiment for assembling the dead-man switch in the console panel, the following three methods have been adopted as effective dead-man switch methods.

1. Switch buttons are arranged on both the side faces of the console panel, and when the console panel is gripped from any side face, the switch is turned on by the palm of the hand.

2. A switch button is arranged on one point of the console panel, and the switch is turned on when one finger is placed on the button and the console panel is grasped in such a manner that the button is depressed.

3. A lever switch is arranged in parallel to a handle, and the switch is turned on when the lever switch and handle are simultaneously grasped.

In the conventional method 1, a condition whereby the palm of the hand is in contact with the console panel should be maintained, and the relatively heavy console panel must always be maintained horizontally or be gripped so that the palm-touching face faces down. Moreover, the user's fingers are likely to slip.

In the above method 2, care should be taken so that the user's does not slip off the button, and the user's finger does not become too fatigued.

In the above method 3, since the handle projects from the console panel, the handle becomes heavy when in the user's hand the user's hand must always grasp it securely. Accordingly, the user's hand becomes fatigued.

As is apparent from the foregoing description, the conventional console panels are hard to grasp and cause fatigue of the hand.

Therefore, an object of the present invention is to provide a console panel which is easy to grasp by the user's hand and does not cause any substantial fatigue of the hand, and whereby a dead-man switch is always firmly actuated.

DISCLOSURE OF THE INVENTION

As shown in FIGS. 1A and 1B, for example, a console panel has a T-figure overall shape and comprises a long keyboard portion 1 and a wide display portion 2. The console panel constructed with an inclined face $C_3$ for touching by the user's hand and is formed on the side edge of the back surface of the console panel. The console panel further includes a pressing plate 9 provided with an elliptical recess 91 having a length $L_3$ sufficient to receive the tips of four fingers and is fitted in a back plate 3 substantially at the center of the outer surface thereof and supported by a plate spring 83. The console panel further has a limit switch 5 which can actuated by pressing against the spring of the pressing plate 9. The recess 91 is located at a position so that the tips of four fingers located on the back surface of the console panel upon grasping the console panel by touching by the palm of the hand on the side face of the console panel, reach the recess 91, regardless of the side from which the console panel is grasped.

If the console panel is grasped by the left hand or right hand in the state where the keyboard portion and display portion of the console panel are located on the front side, the tips of the fingers located on the back side of the console panel are received in the recess 91 and the dead-man switch is actuated only by applying a force acting against the spring 83 to the recess of the pressing plate, regardless of the touching state of each finger and the touching state of the palm of the hand on the side face of the panel. Furthermore, if each finger tip is caught on the recess, the console panel is prevented from falling.

When the console panel is grasped, the tips of all the fingers located on the back surface are caught in the pressing plate, and therefore, the console panel can be easily handled.

Regardless of which part of the pressing plate is depressed, the dead-man switch is actuated, and therefore, the manner of gripping is not critical and fatigue of the hand can be moderated.

Furthermore, since the inclined face which is touched by the hand is formed on the side edge of the console panel, a thumb-touching space is formed on the front side, and the console panel is very easy to hold.

DETAILED DESCRIPTION OF THE INVENTION

Figure 1A:
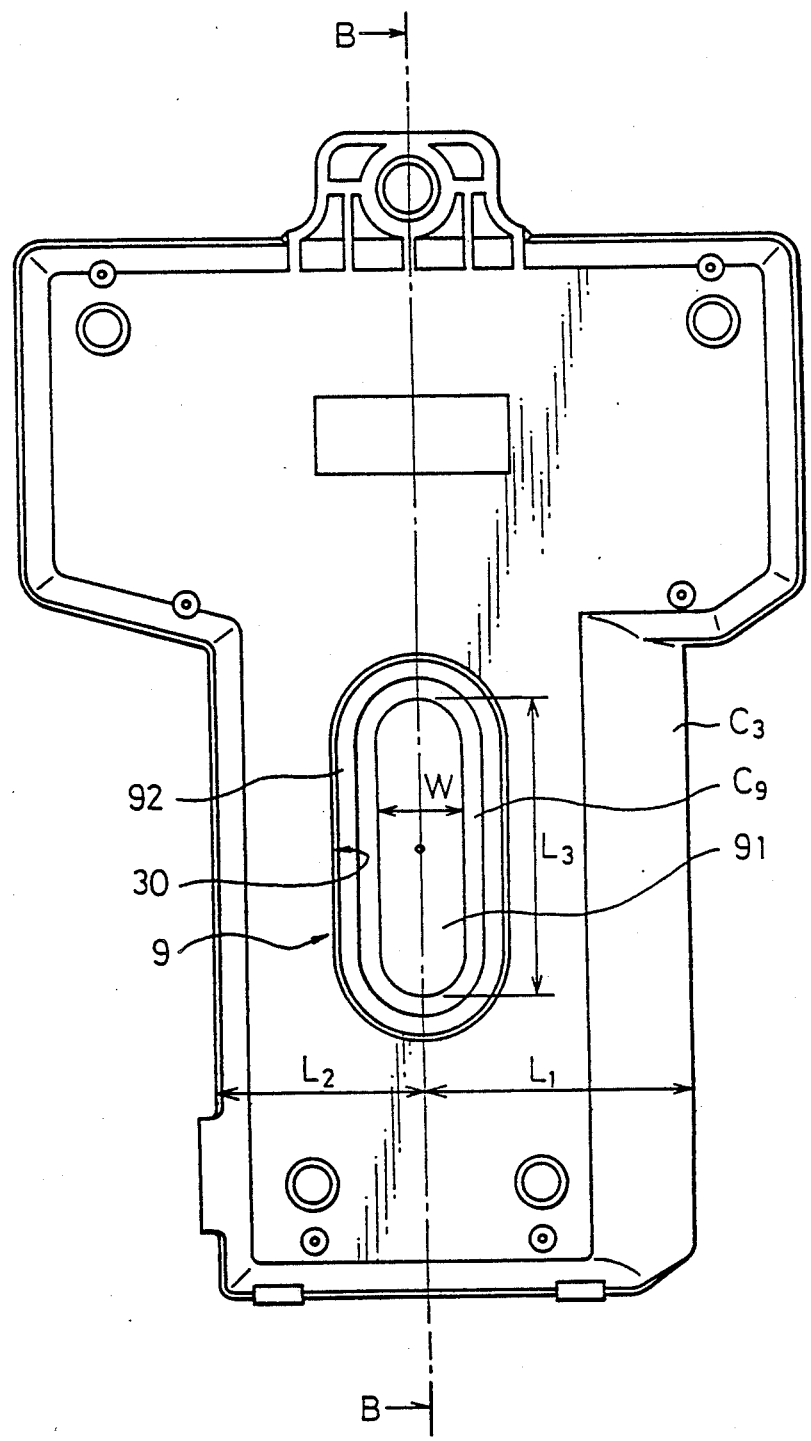
FIG. 1A is a back surface view of the console panel of the present invention.
Figure 1B:
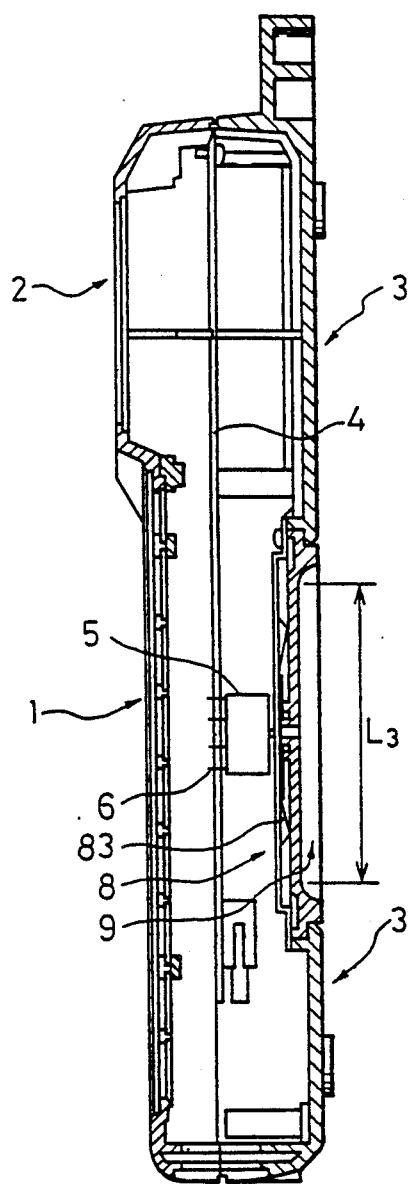
FIG. 1B is a view showing the section taken along the line B—B in FIG. 1A.

The drawings illustrate one embodiment of the present invention and as shown in the drawings, a case is constructed by a front plate of a substantially T-figured shape comprising a long keyboard portion 1 and a wide display portion 2 which are connected to each other, and a back plate 3 having substantially the same shape as that of the front plate. An elliptical hole 30 is formed substantially at the center of the back plate corresponding to the keyboard portion 1, that is, at the position apart by a distance $L_1$ from the left side edge and apart by a distance $L_2$ from the right side edge ($L_1=L_2$), and an attachment rising frame 32 is arranged to surround the elliptical hole 30. An inclined face $C_3$ is formed on one side edge (left touching edge) of the back plate 3.

Figure 2:
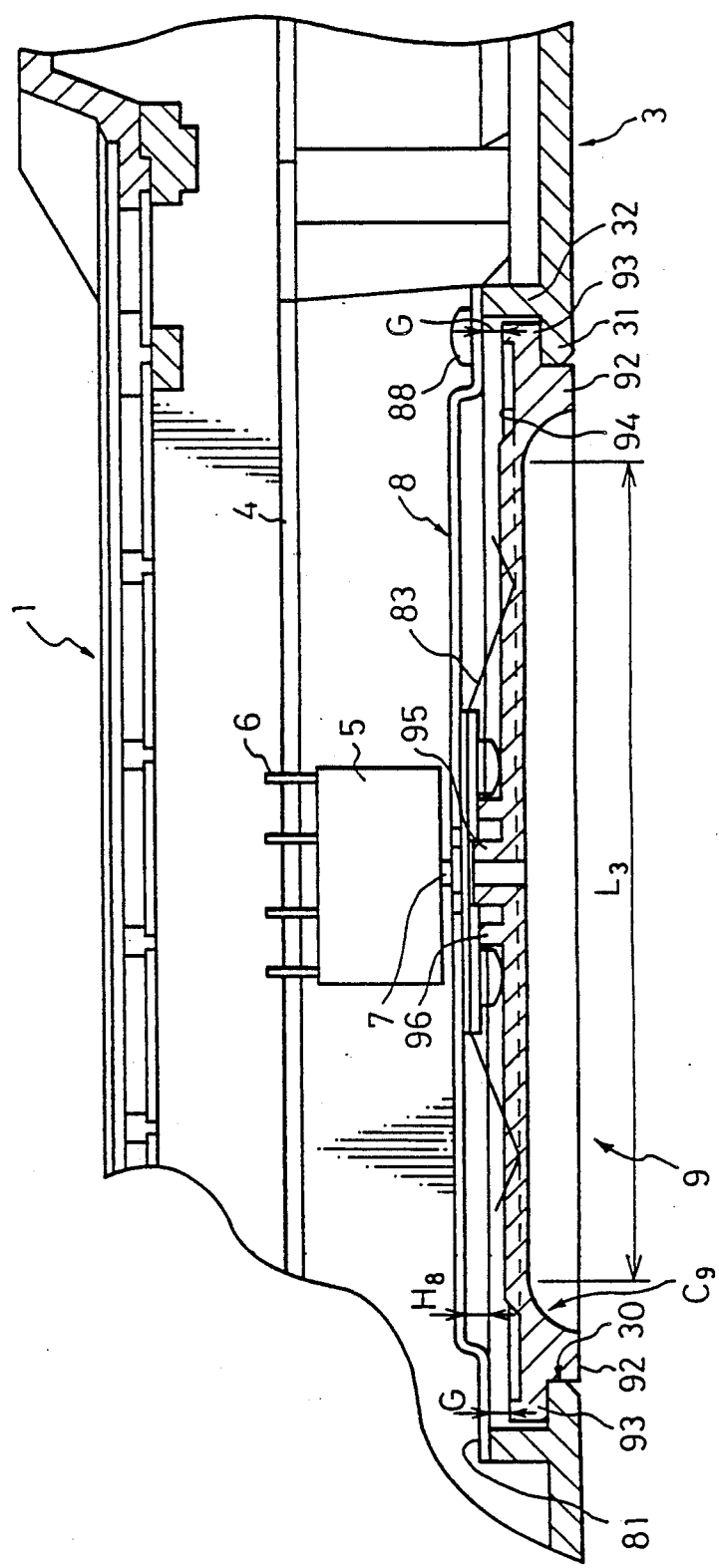
FIG. 2 is an enlarged view showing a part of FIG. 1B.

As seen in FIG. 2, a plugboard 4 is arranged within the case-shaped console panel for wiring various keys (not shown in the drawings) arranged in the keyboard, and a switch 5 is secured to the plugboard 4 through a connecting terminal 6.

Figure 3:
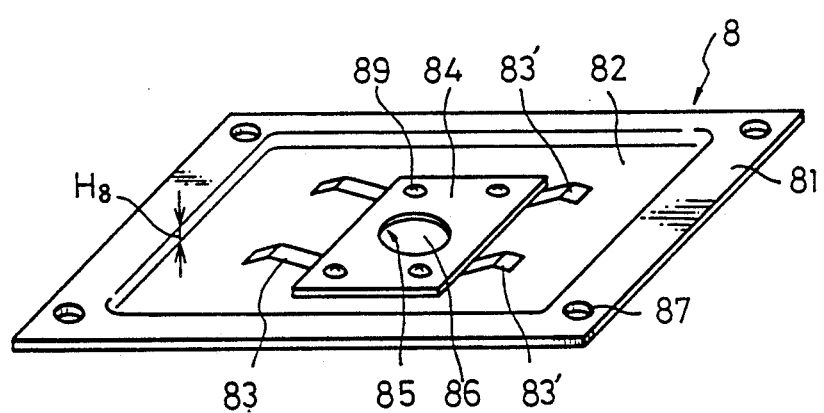
FIG. 3 is a perspective view showing a switch substrate to which a spring is attached.

As is apparent from the drawings (especially FIG. 3), a flange 81 having a height $H_8$ is formed around a switch substrate 8 for attachment of a spring, and attachment screw holes 87 are arranged on four corners and an opening 85 is formed at the center of a base surface 82. This opening 85 is covered with a rubber film 86, and two plate springs 83 inclined and raised on both the ends are supported by an attachment plate 84 having an opening 85. The plate springs 83 are secured between the attachment plate 84 and the base surface 82 by means of screws 89.

Figure 4A:
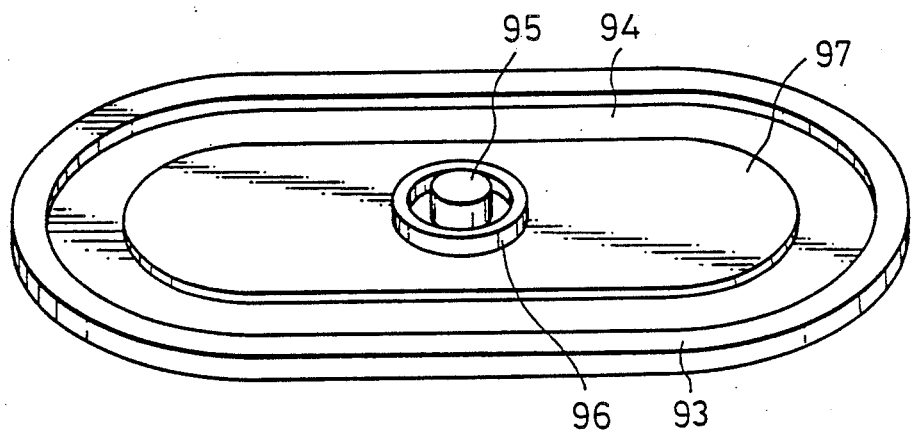
FIG. 4A is a perspective view of the inner face of a pressing plate.
Figure 4B:
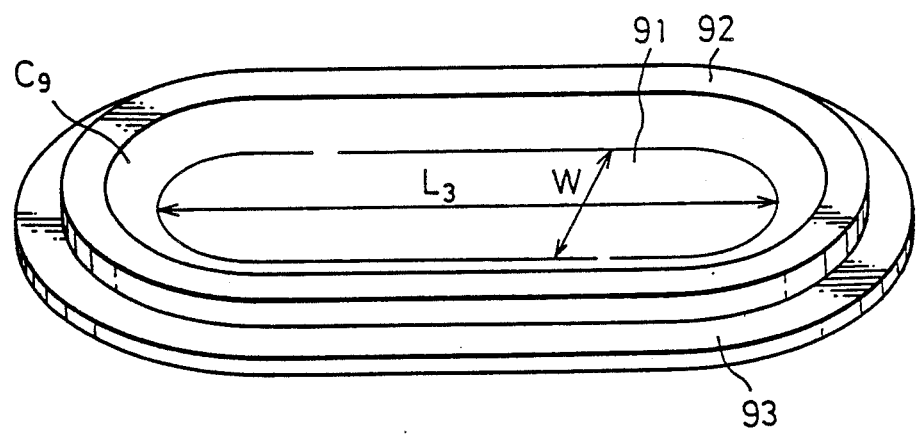
FIG. 4B is a perspective view of the outer face of the pressing plate.

As is apparent from FIGS. 2, 4A and 4B, an elliptical recess 91 having a length $L_3$ slightly longer than the length of the row of four fingers, exclusive of the thumb, in the state arranged in parallel and a width W sufficient for touching by the finger tips is formed on the outer face of a pressing plate 9, and a projecting edge 92 is formed around the recess 91 and a height-reduced supporting flange 93 is formed along the periphery of the projecting edge 92. On the inner face of the pressing plate 9, a concave groove 94 for touching by the plate spring 83 is formed between the flange 93 and base surface 97. A projecting piece 95 for pressing a switch piece 7 is formed at the center and a stopper ring 96 is vertically disposed on the outer side of the projecting piece 95. The pressing plate 9 having the above-mentioned structure is formed of a plastic material.

When assembling the switch portion, as shown in FIG. 2, the pressing plate 9 is inserted in the elliptical hole 30 the flange 93 of the pressing plate 9 is supported by a flange 31 around the elliptical hole 30 of the back plate 3, and then, the touching parts 83' at the four end portions of the plate springs 83 of the switch substrate 83 are fitted in the concave groove 94 of the pressing plate 9. Simultaneously, the switch substrate 8 is capped on the pressing plate 9 so that the opening 85 of the attachment plate 84 agrees with the projecting piece 95 of the pressing plate, and the flange 81 is secured to the attachment rising frame 32 surrounding the elliptical hole 30 of the back plate by insertion of the screws 88. The structural relation between the pressing plate 9 and the switch substrate 8 is hereinafter described. In the non-actuated state, that is, the free state, of the switch, by pressing of the concave groove 93 on the inner face of the pressing plate by the spring pressure of the bent touching parts 83' on both ends of each plate spring 83, a space G is formed between the inner face of the flange 93 of the pressing plate and the outer face of the flange 81 of the switch substrate. If the pressing plate 9 is pressed at any position, that is, if only the top end of the elliptical recess furthest from the center of the pressing plate is pressed, the pressing plate 9 is displaced by the space G against the spring pressure, whereby the projecting piece 95 at the center of the inner face of the pressing plate 9 is caused to press the switch piece 7 of the limit switch 5 through the rubber film 86 to actuate the switch 5. The stopper ring 96 is a stopper for inhibiting excessive intrusion of the projecting piece into the opening 85 and is caused to impinge against the face of the attachment plate 84 around the opening 85.

If the long keyboard portion of the above-described console panel is grasped by the left hand of a right-handed operator from the left side face of the console panel while the surface having the display portion and keyboard portion is located above, the tips of the four fingers located below are caught on the elliptical recess 91 and, therefore the console panel can be easily grasped by dint of the inclined curved face $C_9$ around the recess and the inclined face on the end edge of the back plate 9 in addition to the recess. Furthermore, whatever part of the pressing plate 9 is pressed, the switch 5 is actuated, and therefore, even if the left hand becomes fatigued and the console panel is held in the slightly hung-down state, the dead-man switch is always kept actuated.

Moreover, since the inclined face $C_3$ is formed on the back plate on the gripping side so that the fingers can be easily turned to the lower face, a sufficient space for touching by the thumb can be formed on the end edge portion of the surface.

Moreover, since the opening of the switch substrate for insertion of the projecting piece 95 of the pressing plate is covered with the rubber film, intrusion of dust into the interior of the console panel can be prevented.

Furthermore, by impingement of the stopper ring 96 around the projecting piece 95 against the attachment plate 84, excessive intrusion of the projecting piece 95 can be prevented, and excessive action on the rubber film 86 and switch piece 7 can be prevented.

In the present embodiment, the entire shape of the console panel is designed for a right-handed operator, but the console panel can be formed symmetrically with respect to the longitudinal axis (line B—B in FIG. 1A) so that the console panel can be conveniently held by either the left hand or the right hand.

While the invention has been particularly shown and described in reference to preferred embodiments thereof, it will be understood by those skilled in the art that changes in form and details may be made therein without departing from the spirit and scope of the invention.

Symbols in the Drawings

1: keyboard portion, 2: display portion, 3: back plate, 4: plugboard, 5: limit switch, 6: connecting terminal, 7: switch piece, 8: switch substrate, 9: pressing plate, 30: ellipsoidal hole, 31: flange, 32: attachment rising frame, 81: flange, 82: base surface, 83: plate spring, 83': touching part, 84: attachment plate, 85: opening, 86: rubber film, 87: attachment screw hole, 88: screw, 89: screw, 91: ellipsoidal recess, 92: projecting edge, 93: touching flange, 94: concave groove, 95: projecting piece, 96: stopper ring, 97: base surface, $C_3$: inclined face, $C_9$: inclined curved face, G: space, $H_8$: spring attachment height, $L_3$: length of ellipsoidal recess, W: width of ellipsoidal recess.

We claim:

1. A teaching console panel for a robot having front back and side portions comprising:
    a switch disposed within said console panel;
    a pressing plate operably coupled to said switch having an elliptical recess disposed within a surface of said console panel back portion, wherein said elliptical recess simultaneously accommodates fingers of a panel user for touching said pressing plate when said console panel is gripped by said user; and
    an inclined face portion for accommodating thereon the palm of said user, wherein said inclined face portion is disposed on a longitudinally straight edge portion of said console panel back portion.

2. The teaching console panel as in claim 1, wherein said pressing plate having said elliptical recess is substantially disposed at a center portion of said console panel back portion for simultaneously accommodating said panel user's fingers to thereby permit said switch to be actuated by said pressing plate regardless of where on said pressing plate is pressed by the user's fingers.

3. The teaching console panel as in claim 1, further comprising:

a switch substrate having an attachment plate and a plurality of springs dispersedly coupled to said attachment plate, said attachment plate having an aperture passing through the center thereof, each one of said plurality of springs has a portion for touching said pressing plate, and wherein said pressing plate has on its inner face a projecting member for inserting into said attachment plate aperture, and a stopper ring for impinging against said attachment plate.

4. The teaching console panel as in claim 3, wherein said stopper ring of said pressing plate has a size larger than the size of said aperture passing through said attachment plate.

5. The teaching console panel as in claim 3, wherein said stopper ring impinges against said attachment plate to thereby preclude excessive pressing force from being exerted on said switch by said user.

* * * * *